United States Patent [19]

Barker

[11] Patent Number: 4,901,753

[45] Date of Patent: Feb. 20, 1990

[54] FLOAT ASSEMBLY VALVE

[76] Inventor: Bernard A. Barker, 339 S. Cedar, Monticello, Iowa 52310

[21] Appl. No.: 378,467

[22] Filed: Jul. 11, 1989

Related U.S. Application Data

[63] Continuation-in-part of Ser. No. 320,331, Mar. 7, 1989, abandoned.

[51] Int. Cl.⁴ .................. F16K 43/00; F16K 31/26; F16K 33/00
[52] U.S. Cl. ..................... 137/315; 119/80; 137/436; 137/445; 251/231
[58] Field of Search ............. 137/436, 443, 445, 315, 137/444; 251/231, 232, 279; 119/78, 79, 80

[56] References Cited

U.S. PATENT DOCUMENTS

| | | | |
|---|---|---|---|
| 2,155,698 | 4/1939 | Zinkil | 137/436 |
| 2,270,910 | 1/1942 | Svirsky | 137/445 |
| 2,302,274 | 11/1942 | Svirsky | 137/445 |
| 3,406,711 | 10/1968 | Fogg | 137/445 |
| 3,823,732 | 7/1974 | Elsby | 137/443 |
| 3,835,882 | 9/1974 | Barker et al. | 137/445 |
| 4,796,650 | 1/1989 | Hwang | 137/443 |

FOREIGN PATENT DOCUMENTS 511713  8/1939  United Kingdom ............... 137/443

Primary Examiner—George L. Walton
Attorney, Agent, or Firm—Allan L. Harms

[57] ABSTRACT

A valve assembly of non-metallic construction which requires no tools for disassembly and servicing. A plunger provided with longitudinal channels is activated by a double arm yoke which is acted upon by the float arm. Dual ports provide paired inlet streams directed away from the lever and float.

27 Claims, 2 Drawing Sheets

FLOAT ASSEMBLY VALVE

This is a continuation-in-part of application Ser. No. 320,331, filed Mar. 7, 1989, abandoned.

BACKGROUND OF THE INVENTION

This invention relates to valves for controlling the inflow of a liquid into a reservoir.

Float valves are used for a multitude of applications to control the inflow of water of other liquids into a reservoir when the reservoir needs replenishment. Control of this type of valve is provided by a buoyant member which rides at or near the surface of the liquid in the reservoir and as the liquid level in the reservoir declines below a preset point, the buoyant member causes the opening of the inflow valve to allow the appropriate liquid to enter the reservoir.

Float valve apparatus is commonly used in animal watering apparatus. Such valves are called upon to control the inflow of water into watering tanks or other forms of animal waterers which are kept outside in the elements. The water supplies to such devices may be fed by sources of varying quality. Sand, mineral grains, or other debris may be present in the water source and such inpurities give rise to clogging or other malfunction of the valve mechanism. Also, due to the nature of animal waterers, the water in the waterer must be kept at a reasonable level to supply the animals while turbulence within the reservoir is unavoidable due to the drinking activities of the animals to be watered. Furthermore, overflow of the reservoir is to be carefully avoided due to the undesirable conditions which result from escape of water from the reservoir, that is, mud in summer and ice in winter.

Currently available valve mechanisms are susceptible to the problems set forth above. A popular valve now widely in use in the industry is the subject of U.S. Pat. No. 3,835,882, jointly invented by the instant applicant and another. This device is quite successful in the marketplace but suffers from some susceptibility to clogging and intermittent opening and closing caused by turbulence on the surface of the water in the reservoir. Due to the potential for clogging from debris which may be present in the water supply, the device of U.S. Pat. No. 3,835,882 was designed to be disassembled without the use of hand tools or removal from the device in which it is installed. The instant invention addresses the problems addressed in patent number 3,835,882 and provides substantial novel improvments over that device.

SUMMARY OF THE INVENTION

A valve assembly is provided which provides improved resistance to intermittent operation from reservoir turbulence and which resists clogging by debris in the water supply while still maintaining an assembly which allows disassembly and complete servicing without requiring the use of hand tools or the removal of the assembly from the device in which it is installed.

The assembly is of compact construction and may be installed in various orientations with equally desirable results. A double arm yoke is actuated by a float member extended on a float arm. The yoke depresses and releases a plunger assembly having longitudinal channels on the surface thereof. The exhaust duct of the valve opens to paired ports which release a dual stream of liquid which is directed away from the float arm.

In order to prevent the siphoning of water back through the valve should the valve contact the water level within the tank, louvers are provided within an overlying cap, at the top face of said cap. Such louvers provide a passageway for air to avoid negative air pressure within the cap and at the lever end of the valve assembly.

A first object of the invention is to provide an improved float valve assembly which is repairable without the use of hand tools or removal from the device in which the valve is installed.

Another object of the invention is to provide a flat valve assembly which is less susceptible to clogging from particulates or debris present in the water supply.

Another object of the invention is to provide a float valve assembly which will effectively work with a float which is reduced in size.

Another object of theinvention is to provide a float valve assembly which will provide improved positive activation of the valve function.

Another object of the invention is to provide a float valve assembly which reduces turbulence of the stored liquid in the reservoir when the valve is actuated.

Another object of the invention is to provide a float valve assembly which is not susceptible to siphoning of stored water into the water supply through the valve assembly should the assembly become engaged with the surface of the stored water in the tank.

These and other objects will be apparent from the detailed description which follows:

DESCRIPTION OF THE DRAWING FIGURES

DETAILED DESCRIPTION OF THE INVENTION

Figure 1:
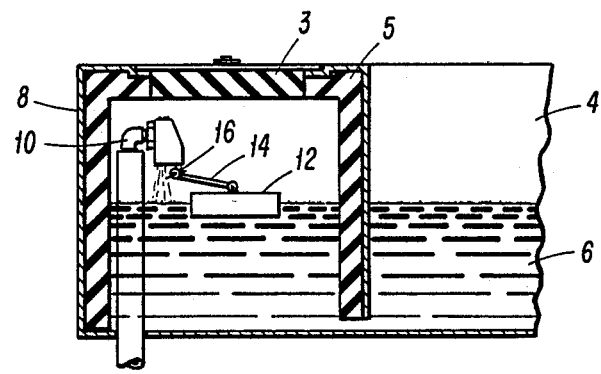
FIG. 1 is a view in partial section a water reservoir device with the invention installed therein.

Referring first to FIG. 1, the invention 2 is seen installed in a water tank 4 containing a supply of water 6 therein. Inlet end 8 of invention 2 is mounted to water pipe 10 in the typical screw coupling fashion. Float 12 is fixed on a float arm 14 which is adjustably mounted to actuator 16. The structure of float 12 and float arm 14 are well known in the art. Compartment cover 3 is fitted in valve compartment 5 of tank 4.

It is anticipated that all parts of valve assembly 2 will be manufactured from non-metallic materials, preferably plastic, though the design of this invention is not limited to use of such materials.

Figure 2:
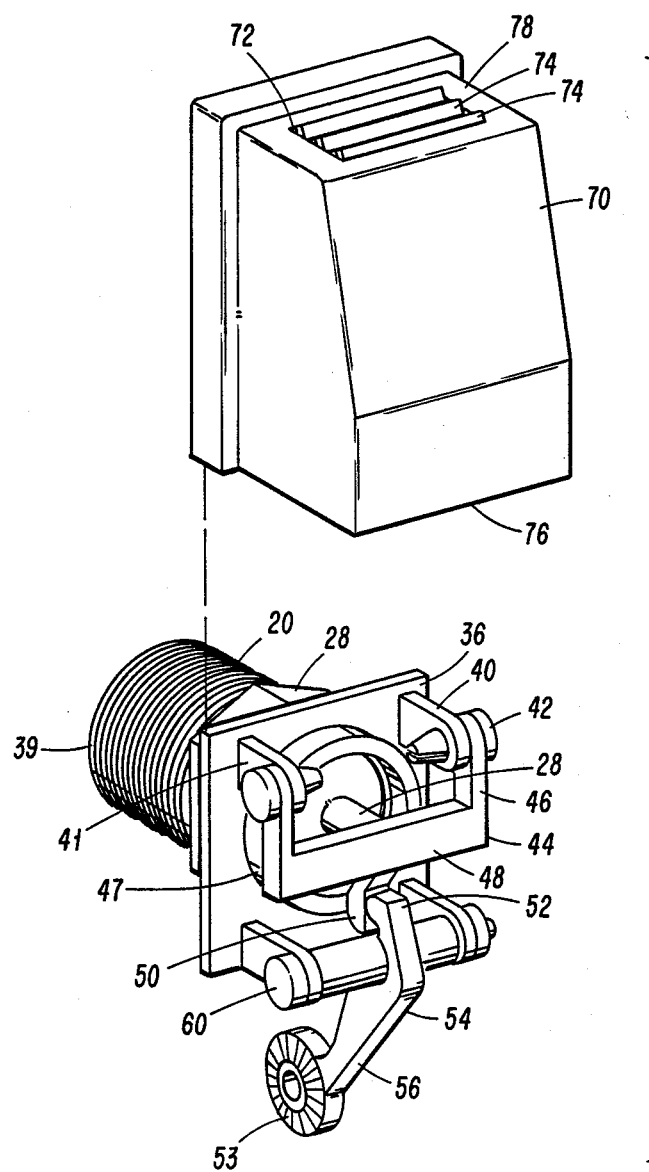
FIG. 2 is a view in perspective of the invention with its cover displaced.
Figure 3:
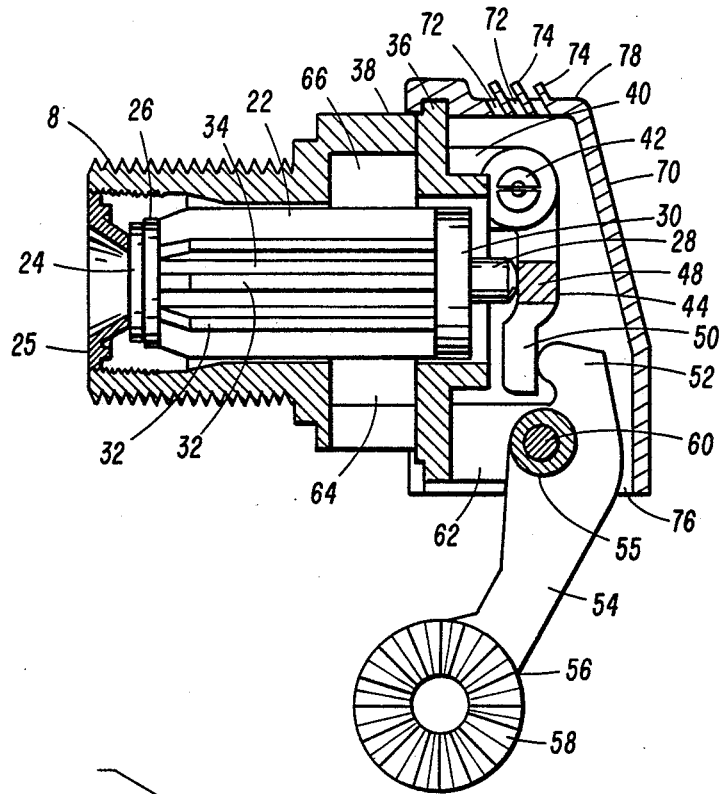
FIG. 3 is a cross section view of the invention.
Figure 4:
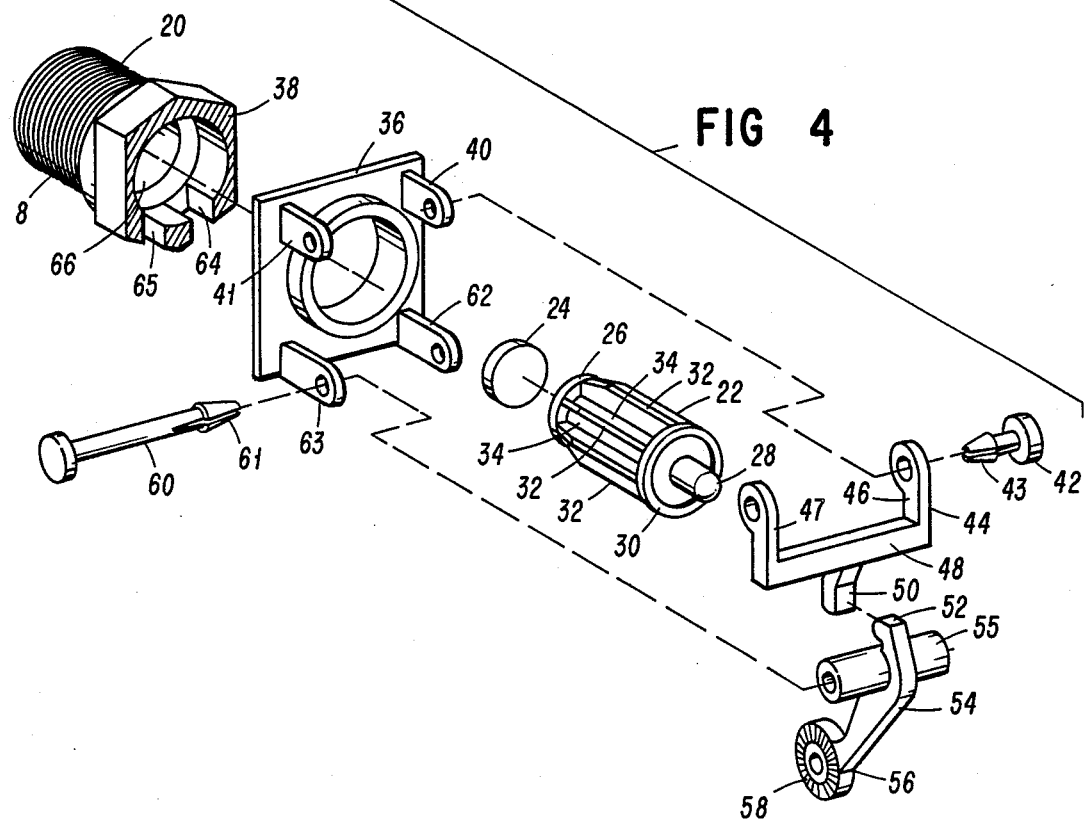
FIG. 4 is an exploded view in perspective of the component elements of the invention.

Referring now to FIGS. 2, 3 and 4, and in particular to FIG. 4, the novel elements of invention 2 can be visualized. Housing 20 is generally elongated having a cylindrical bore plunger chamber 66 therein. Housing 20 slidably receives plunger 22 therein. Plunger 22 is of elongated cylindrical shape suitable to snugly but freely reciprocate within plunger chamber 66. Seal 24 is a suitably shaped element, such as a disk, of compressible material such as rubber or neoprene. Seal 24 is engaged by first end 26 of plunger 22 and is selectively urged by plunger 22 against seat 25. Seal 24 may optionally be removably mounted to plunger 22 at first end 26 thereof. Plunger 22 is provided with a post 28 extending axially from second end 30 thereof. Fins 32 are axially formed upon plunger 22 to create channels 34 along the outer surface thereof. The channels 34 serve to allow particulate matter in the water supply entering housing 20 to pass, rather than to plug the valve assembly 2.

Frame 36 is fixed to housing 20 at its outlet end 38. Yoke 44 comprises a pair of arms 46 and 47 which are jointed by a transverse member 48. Brackets 40 and 41 are fixed upon frame 36 to receive fasteners, such as pin 42, which retain yoke 44 to frame 36 at arms 46 and 47. Pin 42 is retained in position by engagement of shoulder 43 thereof with bracket 40 and as can be readily seen, yoke 44 may pivot relative to frame 36 about an axis which is at right angles to the axis of movement of the plunger 22. It is intended that removal of pin 42 may be accomplished by hand manipulation. The arms 46 and 47 of yoke 44 are retained to frame 36 at one side of plunger 22. Actuator 54 pivots about axle 60 which mounts actuator 54 to frame 36 at brackets 62 and 63. The axis around which actuator 54 may pivot can be seen as generally parallel to the axis of pivot for yoke 44. Axle 60 passes through tube 55 which is located along the length of actuator 54 and is spaced apart from ends 52 and 56 thereof. Since non-metallic parts are used in the preferred embodiment of FIG. 4, it is expected that axle 60 may be installed or removed by finger manipulation, the split shoulder 61 of axle 60 being easily compressible to allow disengagement of shoulder 61 from brackets 62 and 63. Stub 50 depends from transverse member 48 sufficiently to be selectively engaged by first end 52 of actuator 54. Second end 56 of actuator 54 is provided with a textured surface 58 which is intended to abut a generally matable surface on a float arm which is not shown in FIGS. 2-4. If no float arm or other motion limiting element is fixably attached to second end 56 of actuator 54 at surface 58, actuator 54 may pivot in a clockwise direction (when oriented as shown in FIG. 4) so that stub 50 will not be interfered with by first end 52 of actuator 54. When a float arm attached to a float, such as is illustrated in FIG. 1 as float 12 and float arm 14, is fixed to actuator 54 and is properly adjusted, actuator 54 is prevented from pivoting past a point where stub 50 interferes with first end 52 of actuator 54. In this operational position, actuator 54 will be caused to be pivoted in a counterclockwise direction (when oriented as shown in FIG. 4), when a float arm mountable at surface 58 urges actuator 54 in a counterclockwise direction. First end 52 of actuator 54 will bear upon stub 50 thereby urging yoke 44 to pivot in a clockwise direction (when oriented as shown in FIG. 4) and to direct force upon post 28 of plunger 22 at transverse element 48. The force of yoke 44 upon plunger 22 will cause it to urge seal 24 against valve seat 25, as can be seen in the section view of FIG. 3. The pressure of seal 24 upon valve seat 25 prevents flow of water into the valve housing 20 through inlet end 8 of housing 20. If actuator 54 is not prevented from full pivotal motion on axle 60, second end 52 may be displaced out of the path of axial movement of plunger 22.

When counterclockwise urging (when oriented as shown in FIG. 4) is no longer applied to actuator 54, the force upon stub 50 of transverse arm 48 of yoke 44 from first end 52 of actuator 54 is alleviated, resulting in a relaxation of the force of plunger 22 upon seal 24. In this condition, water pressure exerts force against seal 24 to displace it from seat 25 thereby uring plunger 22 against transverse arm 48 at its engagement with post 28. Water may then enter housing 20 at inlet end 8 and pass along channels 34 of plunger 22, thereafter entering passages 64 and 65 of outlet end 38 of housing 20. Outer passageways 64 and 65 communicate perpendicularly with the axis of plunger chamber 66 of housing 20. As shown in FIG. 4, passageways 64 and 65 are of generally rectangular transverse cross section though other configurations wuld equally serve. Water in plunger chamber 66 exits passageways 64 and 65 into the tank 4. The use of a plurality of outlet passageways in outlet end 38 of housing 20 disperses the flow of incoming water entering the tank 4 and reduces the surface turbulence of the water 6. Water exiting passageways 64 and 65 also is directed away from actuator 54. Reduced water turbulence reduces the susceptibility of a float such as float 12 of FIG. 1 to rise and fall sufficiently to intermittently activate the operation of the valve assembly 2. The use of the double arm yoke 44 provides better leverage and therefore a better positive actuation of the plunger 22. This permits use of a smaller float while reducing the potential for seepage past seal 24.

A suitable cover 70 may be slid or snapped into position upon frame 36 and over yoke 44 and actuator 54 mounted to it. When service of the seal 24 or plunger 22 is desired, cover 70 is removed and the float arm may then be disconnected completely or loosened to permit pivoting at its interconnection with actuator 54 at surface 58. Actuator 54 may then be pivoted sufficiently to allow yoke 44 to pass first end 52 of actuator 54 and thus to pivot away from plunger 22. With both yoke 44 and actuator 54 pivoted out of the way, plunger 22 may be pulled from housing 20. Access to seal 24 and to seat 25 is thereby made available. All of these steps can be completed with only hand manipulation and without tools. Removal of the entire valve assembly 2 from its installation is not required to effectuate service of the components thereof.

Cover 70 is provided with elongated openings 72 within wall 78 of cover 70. Wall 78 opposes open end 76 of cover 70. Openings 72 allow the intake of atmospheric air as required to eliminate any syphon action by valve 2 if open end 76 of cap 70 becomes submerged in water, or in the event that passageway 64 and 65 are communicative with water 6 within tank 4.

In the preferred embodiment said openings 72 may be overlain by louvers 74 formed upon face 78 of said cap 70.

Having described the invention, I claim:

1. A float valve for an animal watering tank, the invention comprising a housing having an inlet connectable to a pressurized water source, a valve seat mounted within said inlet, a plunger moveable supported in said housing for axial movement into and out of a seated position with said valve seat, a first lever member pivoted at one end on said housing to one side of said plunger for pivotal movement about an axis normal to the axis of said plunger from a first position in contact engagement with said plunger to a second position out of the path of axial movement of said plunger, a second lever member pivoted on said housing to the opposite side of said plunger for pivotal movement about an axis parallel to the axis of said first lever member, a first end of said second lever member being in overlying contact engagement with the free end of said first lever member, when the first lever member is in the first position therefor, said second lever member being pivotal out of engagement with said free end of said first lever member to a second position out of the path of axial movement of said plunger, said first lever member comprising a single element having a pair of arms pivotally secured at one end thereof to said valve housing, said arms being joined by a unitary transverse element, said transverse element having a radial extension depending therefrom, said extension of said first lever member comprising the free end of said first lever member that is in contact engagement with said second lever.

2. The invention of claim 1 wherein
said plunger is provided with at least one channel therealong.

3. The invention of claim 1 wherein
said plunger is provided with a removable compressible element which is engageable with said valve seat.

4. The invention of claim 1 wherein
said housing has a plurality of outlet openings therein.

5. The invention of claim 1 wherein
said housing is provided with a plurality of outlet passageways communicating with the interior of said housing,
said passageways having axes generally orthogonal to the axis of movement of said plunger.

6. The claim of invention 1 wherein
said transverse element engaging said plunger when said first lever member is in its first position.

7. The invention of claim 1 wherein
said plunger is provided with at least one channel therealong,
said housing has a plurality of outlet openings therein,
said transverse element engaging said plunger when said first lever member is in its first position.

8. The invention of claim 1 wherein
an enclosing cap overlies said first and second lever members,
said cap having one or more openings in a face thereof.

9. The invention of claim 8 wherein
said cap having a top face and an opposing opening,
said openings provided in said top face of said cap.

10. The invention of claim 9 wherein
said openings of said cap are elongate,
said openings are overlain by louvers.

11. Float valve apparatus for an animal watering tank, the invention comprising
a valve housing having an inlet connectable to a source of liquid under pressure,
a valve seat element mounted in said inlet of said valve housing,
a plunger reciprocatingly fitted within said valve housing and selectively engaging said valve seat,
a first lever pivotally mounted to said valve housing,
said first lever interacting with said plunger when said first lever is in a first operating position for selectively urging said plunger in engagement with said valve seat,
an actuating arm pivotally mounted to said valve housing and interacting with said first lever, when said first lever is in its first operating position,
said actuating arm being sufficiently pivotable to allow said first lever to be pivoted to a second position therefor out of the way of the direction of travel of said plunger,
said plunger being slideably removable from said housing when said first lever is pivoted to its second position out of the direction of movement of said plunger,
said first lever comprises a single element having a pair of arms pivotally secured at one end thereof to said valve housing.
said other end of said arms being joined by a unitary transverse element with a radial projection extending from said transverse element for interaction with said actuating arm.

12. The invention of claim 11 wherein
said plunger is provided with axially extending channels upon the outer surface thereof.

13. The invention of claim 11 wherein
said plunger is provided with a removable compressible element which engages said valve seat.

14. The invention of claim 11 wherein
said housing has a plurality of outlet openings therein having axes thereof normal to the axis of movement of said plunger.

15. The invention of claim 11 wherein
said housing is provided with a plurality of outlet passageways communicating with the interior of said housing.

16. The invention of claim 11 wherein
said transverse element engaging said plunger, when said first lever member is in the first position therefor,
said extension of said transverse element overlain by a first end of said actuating arm, when said first lever member is in the first position therefor.

17. The invention of claim 11 wherein
said plunger is provided with axial channels therealong,
said housing has a plurality of outlet openings therein,
said transverse element engaging said plunger, when said first lever member is in the first position therefor,
said extension of said transverse element overlain by an end of said actuating arm, when said first lever member is in the first position therefor.

18. The invention of claim 11 wherein
said projection of said first lever engages said actuating arm, when said first lever is in its first operating position.

19. The invention of claim 11 wherein
said actuating arm is mounted to said housing along the length of said actuating arm,
a first end of said actuating arm overlying said projection of said first lever when said first lever is in the first operating position therefor,
an opposing end of said actuating arm engageable with a float arm having a float attached to the free end thereof.

20. The invention of claim 19 wherein
said plunger is provided with axially extending channels upon the outer surface thereof.

21. The invention of claim 19 wherein
said first lever is removable from said housing by hand manipulation.

22. The invention of claim 19 wherein
said housing is provided with a plurality of outlet passageways communicating with the interior of said housing.

23. A float valve for an animal waterer, the invention comprising
   a valve housing having an inlet connectable to a source of liquid under pressure,
   a valve seat element mounted in said inlet of said valve housing,
   a generally cylindrical body reciprocatingly fitted within said valve housing and selectively engaging said valve seat,
   a first lever pivotally mounted to said valve housing and interacting with said cylindrical body, when said first lever is in a first operating position,
   an actuating arm pivotally mounted to said valve housing and interacting with said first lever, when said first lever is in its first operating position,
   said first lever comprises a single element having a pair of spaced apart, arms joined by a unitary transverse element,
   each of said arms pivotally attached to said housing,
   said transverse element of said first lever engageable with said body,
   said first lever is provided with a projection depending from said transverse element thereof,
   said projection of said first lever engages said actuating arm, when said first lever is in its first operating position,
   said actuating arm being sufficiently pivotable to allow said first lever to be pivoted out of the locus of possible travel of said body,
   said body being slideably removable from said housing when said first lever is pivoted to its second position out of the locus of possible travel of said body,
   said body is provided with a plurality of axially extending channels upon the outer surface thereof.

24. The invention of claim 23 wherein
   said body is provided with a removable compressible element which engages said valve seat when said projection of said first lever urges said plunger in axial movement.

25. The invention of claim 23 wherein
   a cover overlies said first and second lever members,
   said cover having a topmost face thereon,
   said topmost face having at least one opening therethrough.

26. The invention of claim 23 wherein
   said housing has a plurality of radially extending outlet openings therein.

27. The invention of claim 23 wherein
   said body is provided with a removable compressible element which engages said valve seat when said projection of said first lever urges said plunger in axial movement,
   a cover overlies said first and second lever members,
   said cover having a topmost face thereon,
   said topmost face having at least one opening therethrough,
   said housing has a plurality of radially extending outlet openings therein.

* * * * *